United States Patent [19]

Bender

[11] E Re. 29,300

[45] Reissued July 12, 1977

[54] ROTARY PERCUSSION EARTH BORING BIT

[75] Inventor: Mark Leslie Bender, Pearland, Tex.

[73] Assignee: Hughes Tool Company, Houston, Tex.

[21] Appl. No.: 719,204

[22] Filed: Aug. 30, 1976

Related U.S. Patent Documents

Reissue of:

[64] Patent No.: 3,918,538
Issued: Nov. 11, 1975
Appl. No.: 484,838
Filed: July 1, 1974

[51] Int. Cl.[2] ..... E21C 13/06

[52] U.S. Cl. ..... 175/410; 175/390; 175/417

[58] Field of Search ..... 175/92, 231, 385, 395, 175/406, 407, 410, 411, 415, 418–421, 389, 390

[56] References Cited

U.S. PATENT DOCUMENTS

| | | | |
|---|---|---|---|
| 3,158,216 | 11/1964 | Baron et al. | 175/410 X |
| 3,185,228 | 5/1965 | Kelly, Jr. | 175/410 |
| 3,269,470 | 8/1966 | Kelly, Jr. | 175/410 |
| 3,357,507 | 12/1967 | Stewart | 175/418 X |
| 3,388,756 | 6/1968 | Varel et al. | 175/410 |
| 3,537,538 | 11/1970 | Adcock | 175/413 |
| 3,583,504 | 6/1971 | Aalund | 175/410 X |
| 3,717,209 | 2/1973 | Sheldon | 175/413 |
| 3,858,671 | 1/1975 | Kita | 175/410 |

*Primary Examiner*—Ernest R. Purser
*Assistant Examiner*—Richard E. Favreau
*Attorney, Agent, or Firm*—Robert A. Felsman

[57] ABSTRACT

Disclosed herein is a rotary-percussion earth boring bit that has an improved geometric configuration to extend cutting insert life and reduce cutting insert breakage. The bottom surface contains a flat transverse face with a bevelled edge. Two rows of circumferentially spaced cutting inserts protrude from the bevel. One of the rows is spaced inwardly from an outer row to define an inner row, which has inserts positioned between the circumferentially spaced inserts of the outer row. The longitudinal axes of these inserts are substantially perpendicular to the bevel and inclined outward at an acute angle to the axis of rotation of the bit. A generally longitudinally extending groove is formed between each two adjacent inserts of the outer row. This arrangement produces a symmetry that tends to minimize the number of reflective surfaces. This equalizes the stresses generated by the impact induced shock waves transmitted through the bit.

4 Claims, 4 Drawing Figures

ROTARY PERCUSSION EARTH BORING BIT

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates in general to improved rotary-percussion earth boring bits and in particular to improvements in the geometric relationship of the lower region of the bit and cutting inserts.

2. Description of the Prior Art

The first known commercially successful rotary-percussion earth boring bit of the type having button inserts is described in U.S. Pat. No. 3,185,228 which issued to the assignee of Joseph L. Kelly, Jr. on May 25, 1965. While such bits have been successful, often the outer or gage row of inserts wears out or break before inserts on the inner portions of the bit serve their useful life.

There are several explanations that may explain the variation between gage and inner row insert life. A greater amount of material must be cut by the gage or outer row inserts, which have a greater circumference to travel than the inner row inserts on each revolution of the bit. Greater forces are exerted on the outer row of inserts, for in addition to the vertical compressive forces, large lateral forces occur, resulting from the cutting of the sides of the borehole. The typically used tungsten carbide insert will withstand great compressive forces, but not great lateral or bending forces, thus breakage is more likely.

The outer row inserts are also more likely to be pulled from the support metal of the body by large radial tearing forces. The outer inserts protrude beyond the enlarged lower region of the bit to avoid excessive wear on the lower region surface and wedging. Because the outer inserts are close to the periphery of the bit, support metal is thin in this area. This leads to rupture of the support metal near the periphery.

A number of solutions to the problems of wear, breakage, and tearing for the outer row and their supporting metal have been proposed. However, improvements in the bit life are still needed.

SUMMARY OF THE INVENTION

One of the objects of this invention is to provide an improved geometric configuration for a rotary-percussion earth-boring bit such that the outer row inserts are positioned to better withstand vertical, lateral, and radial forces. Another object is to provide the outer row inserts with additional supporting metal. Another object is to provide a bevel at the corner between the transverse base and lower region to increase stability and facilitate cuttings removal. Another object is to provide larger equally spaced generally longitudinal grooves to facilitate cuttings removal. Another object is to minimize abrupt changes in adjacent transverse cross sections through utilization of a configuration that approaches symmetry as close as practicable near the outer periphery of the bit.

In accordance with these objects, the body of the bit has torque transmission means such as splines and an upper anvil surface to receive successive impacts from a fluid operated hammer. An enlarged lower region with a transverse face, containing button type inserts, is formed on the bit, and the body is formed of a single mass of metal. At the corner of the enlarged lower region and the transverse face, a bevel is formed. The bevel contains two circumferentially and alternately spaced rows of inserts protruding outward with their longitudinal axes substantially perpendicular to the bevel. Between each of the outer rows of these inserts, generally longitudinal grooves for cuttings return are formed. The inner row of inserts located on the bevel are spaced inwardly and between the outer row.

Consequently the inner row leads the outer row in cutting the bottom of the borehole to form a somewhat conical bottom hole pattern. This increases the life of the inserts. Breakage is reduced because the lateral forces are shared between more inserts. The section of support metal for each insert is increased because the longitudinal axes of inner and outer rows form substantially the same angle with respect to the vertical axis of the bit. Cuttings return flow is increased because of larger and uniform cuttings return grooves. Other objects, features and advantages will become apparent hereinafter.

DESCRIPTION OF THE PREFERRED EMBODIMENT

Figure 1:
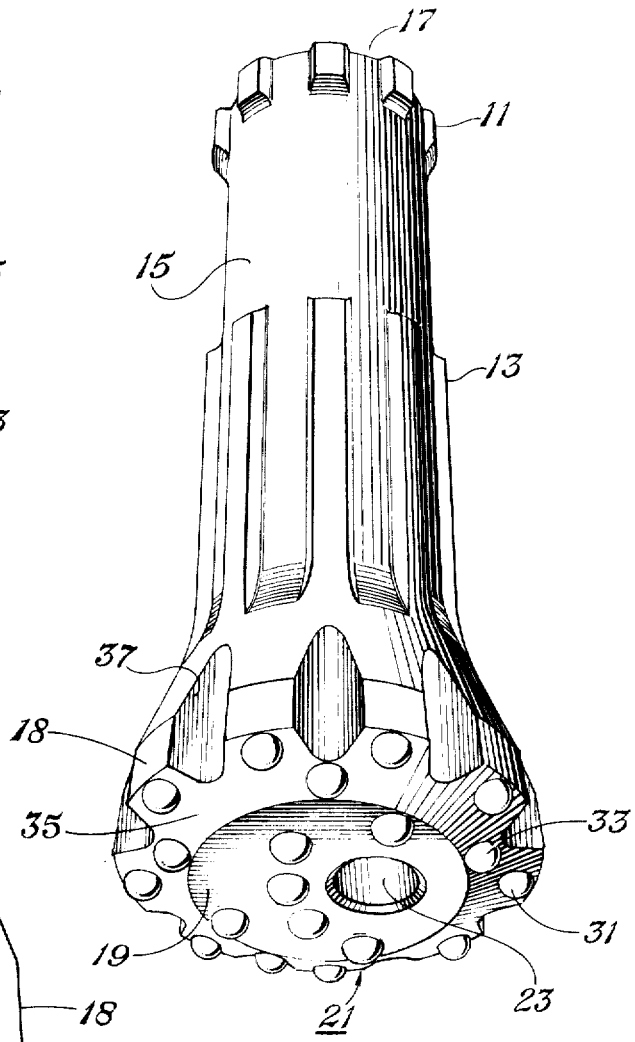
FIG. 1 is a perspective view as seen looking obliquely from a corner on the lower region of the bit body to show the preferred relationship of the transverse face of the bit with the button type inserts and the bevel.
Figure 3:
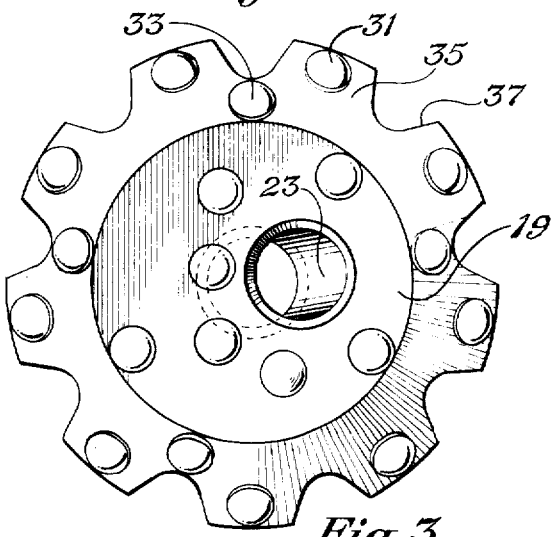
FIG. 3 is a bottom view of the bit shown in FIG. 1.
Figure 4:
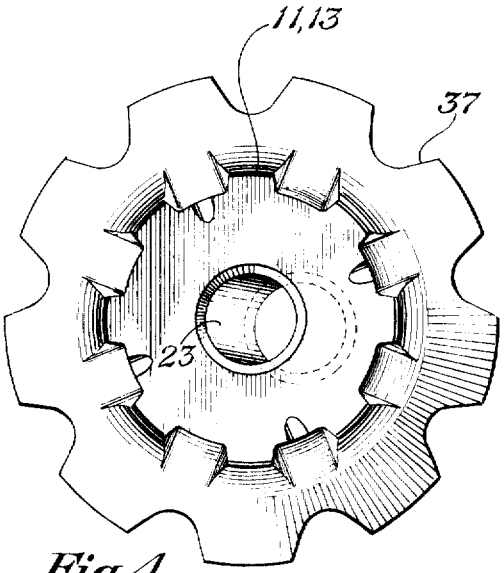
FIG. 4 is a top view of the bit shown in FIG. 1.

Referring initially to FIG. 1 of the drawing, a rotary percussion type earth boring bit is shown in perspective and includes a torque transmission means that includes splines 11, 13. These splines are adapted to be assembled with mating splines in the housing (not shown) of a motor having a fluid driven reciprocating piston that periodically engages an anvil upper surface 17 of the bit. It is conventional for a split-ring (not shown) to be assembled around a cylindrical surface 15 to engage shoulders in the housing and retain the bit for reciprocation in the housing and rotation with the housing. Such arrangements are well known in the art and the invention is not limited to use with any particular form of housing or motor.

The bit also includes an enlarged lower region 18 that terminates in a transverse face 19 containing a plurality of button type inserts 21. The term "button type insert" refers to those wear resistent inserts described in the previously mentioned U.S. Pat. No. 3,185,228. Commonly, such inserts are constructed of sintered tungsten carbide and are well known in the art.

Figure 2:
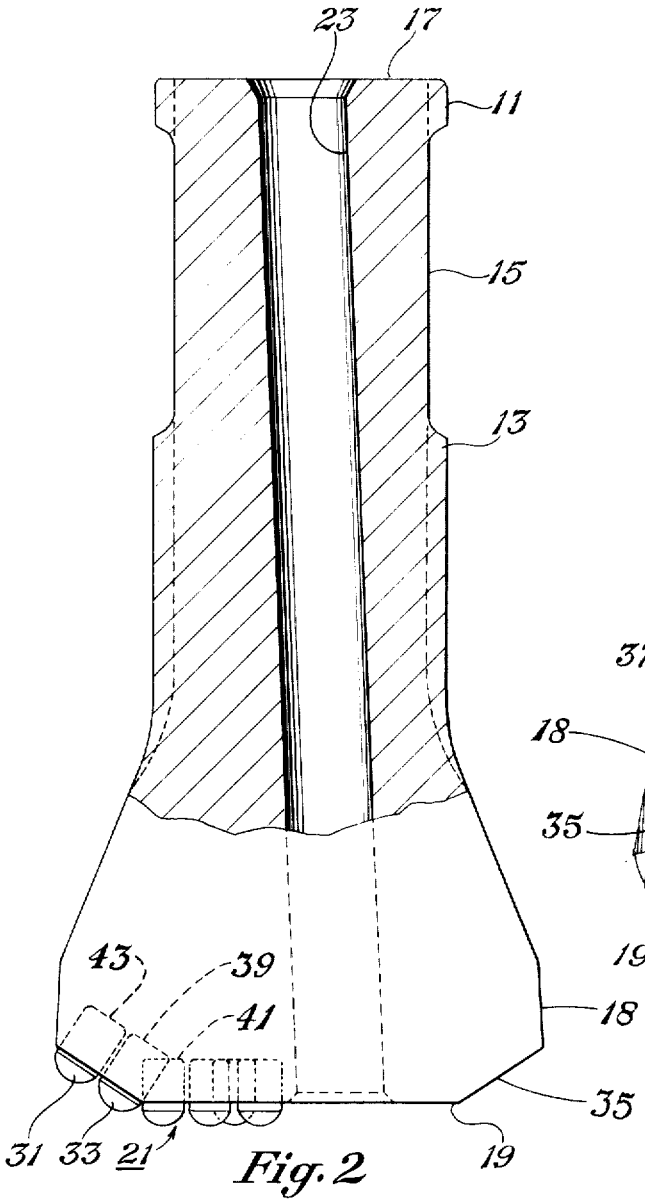
FIG. 2 is a longitudinal cross-section view of the bit shown in FIG. 1, except some inserts have been moved to show their relative paths on the borehole bottom during rotation of the bit.

The bottom surface of the bit includes a flat transverse face 19 and bevel 35. The bevel may be formed as a frusto-conical surface at the corner of the transverse face 19 and enlarged lower region 18. However, it may also be formed as a somewhat curved surface. An outer row of inserts 31 is spaced circumferentially about the bevel 35. Between each insert 31, a generally longitudinally extending groove 37 forms a return course for cuttings. An inner row of inserts 33 is circumferentially spaced on the bevel 35 inwardly and between the circumferentially spaced inserts 31. Each of the inserts 31, 33 protrudes from the bevel 35, being inserted in machined holes with interference fit in the manner well known in the art. The longitudinal axes of the inserts 31, 33 are substantially perpendicular to the surface of the bevel 35. Since the bevel 35 is substantially flat or only slightly curved, the longitudinal axes of the inserts 31, 33 form substantially the same acute angle with respect to the axis of revolution of the bit. The remaining inserts 21 are distributed on the transverse face 19 to cooperatively cover, during rotation, the borehole bottom as indicated in FIG. 2.

The body of the bit is preferably constructed of a single mass of metal through which a single air course 23 extends obliquely from the anvil surface 17 until it intersects the transverse face 19. The center of the resulting aperture on the transverse face 19 is offset from the axis of revolution or centerline of the bit so that an innermost insert can effectively remove earth from the center region of the borehole bottom.

It should be apparent from the foregoing description that an invention having significant advantages has been provided. The invention solves the problem of how and where to place more inserts to alleviate work and stress required of the outer row inserts 31, without reducing the support metal section. Placing an inner row of inserts 33 radially in-line with the outer row of inserts 31 was not feasible since this led to loss of section of the supporting metal. Staggering an inner row of inserts 33 between the outer row 31 and at a different angle resulted in reduction in the size of cuttings return grooves 37. Also, having outer and inner row inserts at different angles caused reduction in section of the support metal between inserts.

Prior art solutions placed the inner row of inserts 33 in a substantially vertical position or lesser angle of inclination than the outer row 31, which inclined outwardly to cut the side of the borehole. The reason for the differing angles of inclination was to align the longitudinal axes of the inserts 31, 33 substantially in the direction of the resultant of the lateral forces from the side of the borehole. Thus it was thought that to align the inner row 33 outwardly at the same acute angle would subject it to too much bending force from the vertical direction.

Placing the inner inserts 33 substantially vertical or at a lesser angle of inclination than outer inserts 31 may have placed their longitudinal axes more in line with the differing resultant forces, however it deprived both rows 31, 33 of needed support section. It is desirable to place inserts 33 as close to the cuttings return groove 37 as possible to share the work load of outer inserts 31. But because the longitudinal axes of the inner inserts 33 were near vertical, the base 39 was also close to return groove 37 and support section was reduced, leaving support only on the inward periphery. Also, as the phantom lines designating bases 39, 41 in FIG. 2 show, if adjacent inserts incline at different angles, the phantom lines intersect. Less body section is available to resist radial tearing forces than if the phantom lines do not intersect as bases 39 and 43. Further outward, on base 43, the radial force is greater than on base 41, requiring more section for support.

The use of a bevel 35 with inner and outer rows 31, 33 protruding outward from it at substantially the same angles of inclination with respect to the bit axis of revolution solves the problem. The work load of the outer row 31 is reduced, body support section is sufficient, yet cuttings return grooves 37 are increased in area. The inner row 33 leads the outer row 31 in cutting portions of the side of the borehole. This reduces the work required of the outer row 31 and shares in lateral forces. The resultant forces acting on each row 31, 33 are not precisely in the same direction, yet because the rows 31, 33 are perpendicular to the surface of bevel 35, they are able to withstand bending forces. Because of the outward inclination, the cutting tips of inserts 33 are on the periphery of the bit where they are needed, yet their bases 39 are inward where there is sufficient body section for support. Large cutting return grooves 37 are possible because of the inward placement of base 39.

Furthermore, the use of a large bevel 35 gives greater bit stability because of the partial cone-shaped uncut bottom of the borehole. Cutting chip removal is more effective because of the gradual transition from the horizontal borehole bottom to the vertical borehole sides. Flat chips cut from the bottom of the borehole will not clog when they change directions from horizontal to vertical on being carried outward and upward. Because the return flow air is large and uniform, large cutting chips can be removed quickly, thus avoiding inefficient cuttings regrinding.

While this invention has been shown in only one of its forms, it should be apparent to those skilled in the art that it is not so limited but is susceptible to various changes and modifications without departing from the spirit thereof.

I claim:

1. An improved geometric configuration for a rotary-percussion earth-boring bit that includes a body having torque transmission means on an upper region, an anvil upper surface and an enlarged lower region with a transverse face containing button type inserts, the improvement comprising:

a bevel formed at the corner between the transverse face and the enlarged lower region;

an outer row of circumferentially spaced inserts protruding from said bevel;

an inner row of circumferentially spaced inserts located inwardly wholly on said bevel and between the circumferentially spaced inserts of the outer row;

the inserts of the inner and outer rows having longitudinal axes that are substantially normal to the bevel.

2. An improved geometric configuration for a rotary-percussion earth-boring bit that includes a body having torque transmission means on an upper region, an anvil upper surface and an enlarged lower region with a transverse face containing button type inserts, the improvement comprising:

a bevel formed at the corner between the transverse face and the enlarged lower region;

an outer row of circumferentially spaced inserts protruding from said bevel;

an inner row of circumferentially spaced inserts located inwardly on said bevel and between the circumferentially spaced inserts of the outer row;

the inserts of the inner and outer rows having longitudinal axes that are substantially normal to the bevel;

a longitudinally extending groove formed in the enlarged lower region between each two adjacent circumferentially spaced inserts of the outer row.

3. An improved geometric configuration for a rotary-percussion earth-boring bit that includes a body having torque transmission means on an upper region, an anvil upper surface and an enlarged lower region with a transverse face containing button type inserts, the improvement comprising:

a frusto-conical bevel formed at the corner between the transverse face and the enlarged lower region;

an outer row of circumferentially and substantially *equally* spaced inserts protruding from said bevel;

an inner row of circumferentially [and substantially equally] spaced inserts located inwardly wholly on said bevel and between the circumferentially spaced inserts of the outer row;

the inserts of the inner and outer rows having longitudinal axes that are substantially perpendicular to the bevel.

4. An improved geometric configuration for a rotary-percussion earth-boring bit that includes a body having torque transmission means on an upper region, an anvil upper surface and an enlarged lower region with a transverse face containing button type inserts, the improvement comprising:

a frusto-conical bevel formed at the corner between the transverse face and the enlarged lower region;

an outer row of circumferentially and substantially *equally* spaced inserts protruding from said bevel;

an inner row of circumferentially [and substantially equally] spaced inserts located inwardly on said bevel and between the circumferentially spaced inserts of the outer row;

the inserts of the inner and outer rows having longitudinal axes that are substantially perpendicular to the bevel;

a longitudinally extending groove formed in the enlarged lower region between each of the inserts of the outer row.

* * * * *